United States Patent
Fordos et al.

(10) Patent No.: US 12,052,148 B2
(45) Date of Patent: *Jul. 30, 2024

(54) PARALLEL SERVICE INVOCATION IN A NETWORK

(71) Applicant: Cisco Technology, Inc., San Jose, CA (US)

(72) Inventors: Viktoria Fordos, Bandhagen (SE); Claes Daniel Nasten, Burea (SE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,428

(22) Filed: Jul. 24, 2023

(65) Prior Publication Data

US 2023/0370343 A1   Nov. 16, 2023

Related U.S. Application Data

(63) Continuation of application No. 17/545,218, filed on Dec. 8, 2021, now Pat. No. 11,757,733.

(51) Int. Cl.
*H04L 41/5054* (2022.01)
*H04L 41/0873* (2022.01)
*H04L 41/0893* (2022.01)

(52) U.S. Cl.
CPC ...... *H04L 41/5054* (2013.01); *H04L 41/0873* (2013.01); *H04L 41/0893* (2013.01)

(58) Field of Classification Search
CPC . H04L 41/5054; H04L 41/08; H04L 41/0893; H04L 41/0895
See application file for complete search history.

(56) References Cited

U.S. PATENT DOCUMENTS

| | | | |
|---|---|---|---|
| 8,533,303 B2 | 9/2013 | Wikstrom | |
| 9,674,715 B2* | 6/2017 | Ryan | H04L 41/0816 |

(Continued)

FOREIGN PATENT DOCUMENTS

EP     3462316 A1     4/2019

OTHER PUBLICATIONS

Cisneros Josue Castaneda et al: "Towards Consistent VNF Forwarding Graph Reconfiguration in Multi-domain Environments", 2021 IEEE 14th International Conference on Cloud Computing (Cloud), IEEE, Sep. 5, 2021 (Sep. 5, 2021), pp. 355-366, XP034012563, DOI: 10.1109/Cloud53861.2021.00049 [retrieved on Oct. 19, 2021] the whole document.

(Continued)

*Primary Examiner* — Joe Chacko
(74) *Attorney, Agent, or Firm* — Lee & Hayes, P.C.

(57) ABSTRACT

Techniques and mechanisms for managing a set of data network nodes in a Network Management System (NMS). In some examples, a network orchestrator receives a first service request to trigger a first service transaction to re-configure the set of data nodes in the data network, and trigger, the first service transaction to re-configure the set of data nodes. In some examples, the network orchestrator receives a second service request to trigger a second service transaction to re-configure the set of data nodes. The orchestrator determines whether the second service transaction conflicts with the first service transaction that is currently running. If the second service transaction does not conflict with the first service, it triggers processing the second service. If the second service transaction does conflict with the first service transaction, it delays from processing the second service transaction.

20 Claims, 7 Drawing Sheets

(56) References Cited

U.S. PATENT DOCUMENTS

| | | | |
|---|---|---|---|
| 10,212,223 B2* | 2/2019 | Rolia | H04L 41/5051 |
| 11,057,275 B1* | 7/2021 | Arunachalam | H04L 41/0895 |
| 2006/0004757 A1 | 1/2006 | Watts | |
| 2008/0065466 A1 | 3/2008 | Liu | |
| 2009/0300017 A1* | 12/2009 | Tokusho | G06F 16/2343 |
| 2013/0067047 A1 | 3/2013 | Wikstrom | |
| 2013/0262423 A1 | 10/2013 | Graefe et al. | |
| 2020/0112861 A1 | 4/2020 | Yao et al. | |
| 2020/0341617 A1 | 10/2020 | Xiong et al. | |
| 2021/0049050 A1* | 2/2021 | Goodwin | G06F 9/5077 |
| 2021/0096895 A1 | 4/2021 | Reid et al. | |
| 2021/0144517 A1 | 5/2021 | Guim Bernat et al. | |
| 2023/0179492 A1 | 6/2023 | Fordos | |

OTHER PUBLICATIONS

Office Action for U.S. Appl. No. 17/545,218, mailed on Dec. 5, 2022, Fordos, "Parallel Service Invocation in a Network" 13 pages.
Office Action for U.S. Appl. No. 17/545,218, mailed Jul. 8, 2022, Fordos, "Parallel Service Invocation in a Network", 12 pages.
The PCT Search Report and Written Opinion mailed Mar. 22, 2023 for PCT application No. PCT /US2022/052256, 15 pages.

* cited by examiner

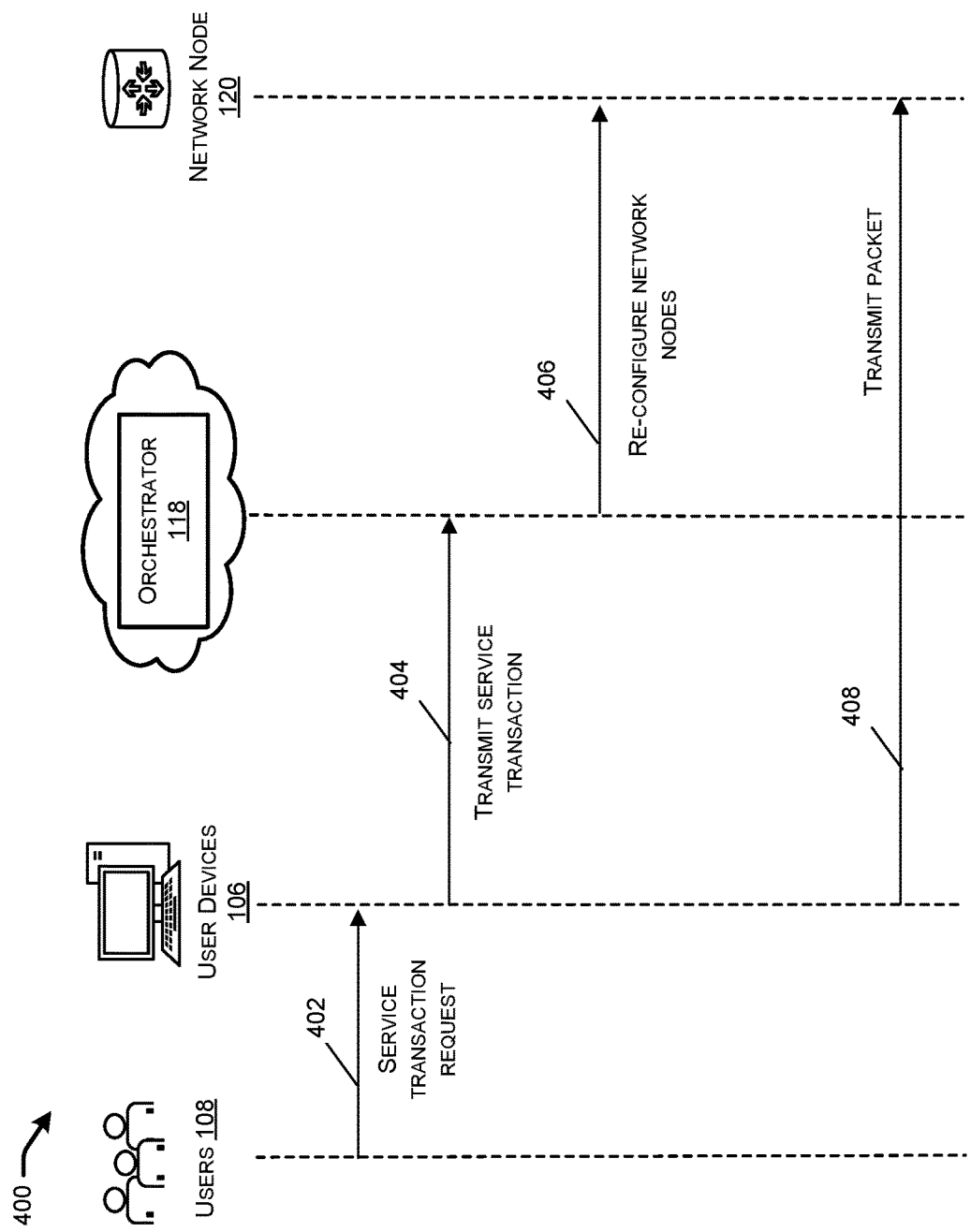

500

```
┌─────────────────────────────────────────────────────────────────┐
│  RECEIVING, AT THE NETWORK ORCHESTRATOR, A FIRST REQUEST TO     │
│  TRIGGER A FIRST SERVICE TRANSACTION TO RE-CONFIGURE A SET OF   │
│            DATA NODES IN THE DATA NETWORK                       │
│                            502                                  │
└─────────────────────────────────────────────────────────────────┘
                               │
                               ▼
┌─────────────────────────────────────────────────────────────────┐
│  TRIGGERING, BY THE NETWORK ORCHESTRATOR, THE FIRST SERVICE     │
│     TRANSACTION TO RE-CONFIGURE THE SET OF DATA NODES           │
│                            504                                  │
└─────────────────────────────────────────────────────────────────┘
                               │
                               ▼
┌─────────────────────────────────────────────────────────────────┐
│  RECEIVING, AT THE NETWORK ORCHESTRATOR, A SECOND REQUEST TO    │
│  TRIGGER A SECOND SERVICE TRANSACTION TO RE-CONFIGURE THE SET   │
│                         OF NODES                                │
│                            506                                  │
└─────────────────────────────────────────────────────────────────┘
                               │
                               ▼
┌─────────────────────────────────────────────────────────────────┐
│  DETERMINING WHETHER THE SECOND SERVICE TRANSACTION CONFLICTS   │
│   WITH THE FIRST SERVICE TRANSACTION THAT IS CURRENTLY RUNNING  │
│                            508                                  │
└─────────────────────────────────────────────────────────────────┘
                               │
                               ▼
┌─────────────────────────────────────────────────────────────────┐
│  IN RESPONSE TO DETERMINING THAT THE SECOND SERVICE TRANSACTION │
│   DOES NOT CONFLICT WITH THE FIRST SERVICE TRANSACTION,         │
│           TRIGGERING THE SECOND SERVICE TRANSACTION; OR         │
│  IN RESPONSE TO DETERMINING THAT THE SECOND SERVICE TRANSACTION │
│   DOES CONFLICT WITH THE FIRST SERVICE TRANSACTION, REFRAINING  │
│         FROM TRIGGERING THE SECOND SERVICE TRANSACTION.         │
│                            510                                  │
└─────────────────────────────────────────────────────────────────┘
```

FIG. 5

PARALLEL SERVICE INVOCATION IN A NETWORK

RELATED APPLICATIONS

This application claims priority to and is a continuation of U.S. patent application Ser. No. 17/545,218, filed on Dec. 8, 2021, the entire contents of which are incorporated herein by reference.

TECHNICAL FIELD

The present disclosure relates generally to using a Network Management System (NMS) to configure and optimize a set of data nodes and services in a data network, and enable execution of multiple transactions in the nodes of the data network.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of network architectures, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Computing networks have continued to become more complex, such as with the introduction of software-defined networks (SDNs). In SDNs, the management of networks is centralized at a controller or orchestrator such that the control plane is abstracted from the data forwarding functions in the discrete networking devices. The SDN orchestrator is the core element of an SDN architecture and enables centralized management and control, automation, and policy enforcement across physical and virtual network environments. Various standards or protocols have been developed for SDN architectures, such as OpenFlow, Programming Protocol-independent Packet Processors (P4), open virtual switch database (OVSDB), Python, and so forth. These SDN protocols allows the SDN orchestrator to directly interact with the forwarding plane of network devices (such as switches and routers) using, for example, various application programming interfaces (APIs).

Traditionally, SDN would use these SDN protocols in order to program network devices or push down changes to the switch/router flow-table, thereby allowing the SDN controller to partition traffic, control flows for optimal performance, test new configurations and applications, and/or otherwise control or steer data plane traffic. To perform various services, network nodes or devices need to be configured to execute several different type of network functions (e.g., packet drop functions, packet duplicate functions, packet forward functions, etc.). However, it can be inefficient, insecure, or otherwise disadvantageous to configure services for individual managed devices or nodes of a data network. For instance, creation of service instances for individual devices or nodes in the data network, typically affects several other managed devices or nodes. Thus, creation of a service in the data network typically may include a series of reconfigurations of several different devices or nodes in the data network. Additionally, as needs of the network change, it may be necessary to re-configure the individual network devices or nodes, which can be inefficient, and time consuming.

In light of various inefficiencies and disadvantages of managing and configuring individual devices and nodes in a data network, a Network Management System (NMS) NMS can configure services in a data networks instead of configuring the individual managed devices or nodes in the data network, allowing networks to be more flexible and cost-effective. An NMS is typically an application or set of application that lets the network users manage the network devices inside the data network, and perform several key functions. An NMS identifies, configures, monitors, updates and troubleshoots network devices in the data network, allowing the network users to configure the devices, analyzes and monitor the performance, or make changes as needed. In addition, NMS enable network vendors to provide their performance data to the NMS through Application programming Interface (API) or a protocol (e.g., Netflow). Thus, NMS provides a powerful, flexible and extensible toolbox for network orchestration and automations which enables network users and vendors to control or add features to a wide variety of network devices efficiently. For instance, in a data network which includes NMS, the network client may only need to provide a source code indicating the NMS node how to deploy a service, and the NMS will process and execute the service automatically. However, as the number of service requests increase in the data network, the orchestrator will not be able to scale to process the service request efficiently, and thus the network users may experience longer deployment time for their request. Therefore, there is a need for mechanisms and methods to provide parallel execution of multiple transactions in the orchestrator, and to reduce the processing time of the service requests.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 further illustrates a network orchestrator and its service processing flow for processing multiple transactions.

FIG. 4 is a flow diagram of an example method illustrating the communication flow among the network orchestrator and other network devices for processing multiple transactions in a data network.

FIG. 5 illustrates a flow diagram of an example method for processing multiple transactions in an orchestrator of a data network.

DESCRIPTION OF EXAMPLE EMBODIMENTS

Overview

Figure 1:
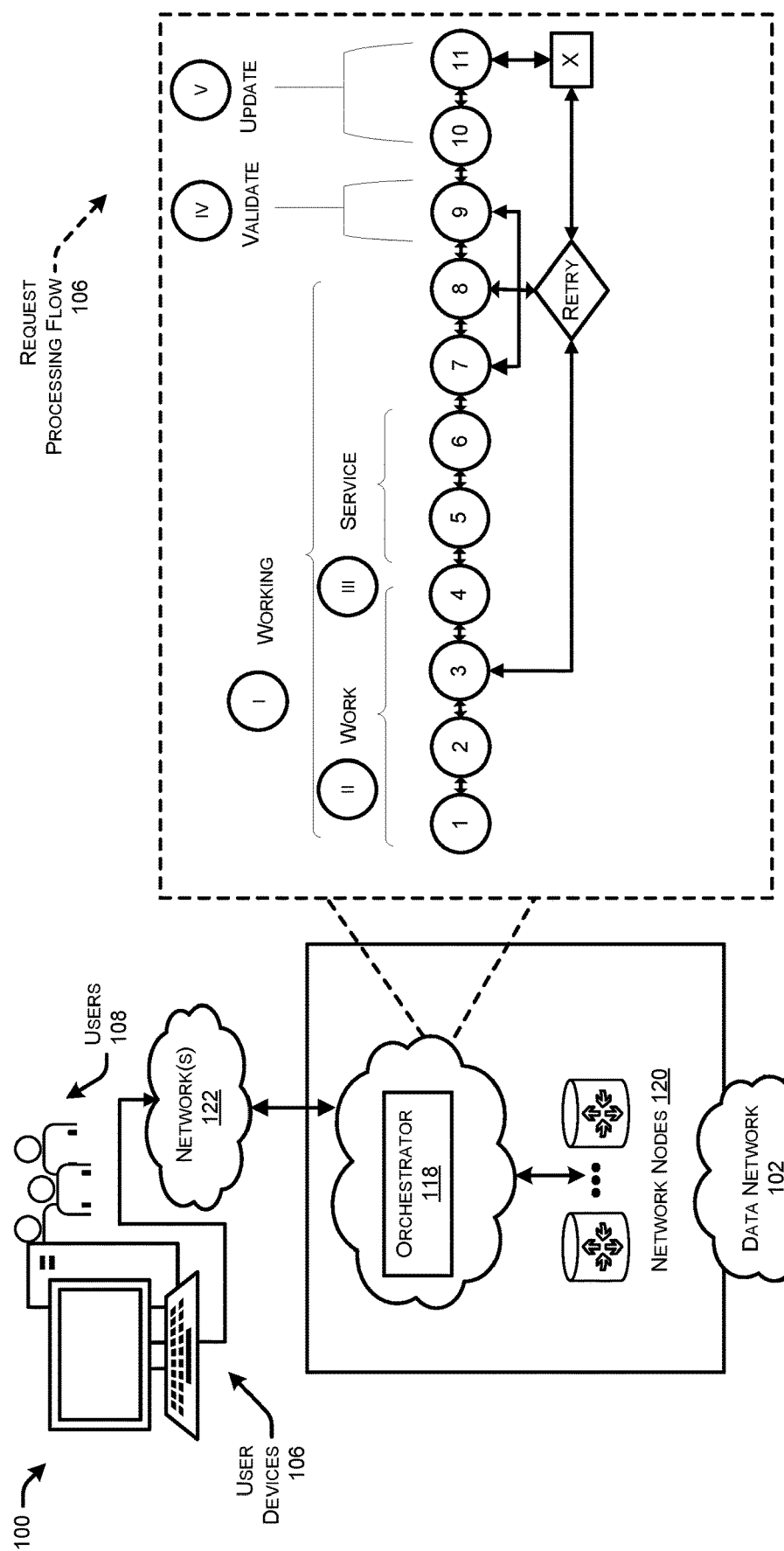
FIG. 1 illustrates a system architecture for a Network Management System (NMS) for configuring a set of network devices in a data network.

The present disclosure describes a Network Management System (NMS) which reduces the programing complexity of configuring a set of network modes or devices in a data network in response to services requests changes requesting creation, deletion and modification of network services to be performed in the set of network devices. The NMS consist of a network orchestrator for managing and processing service requests changes from the network devices.

This disclosure further describes a method for a network orchestrator to manage a set of data network nodes in the NMS in a data network, the method may performed using control-plane techniques by the orchestration component (e.g., software defined network (SDN) controller). The method may include receiving, at the network orchestrator, a first request to trigger a first service transaction to re-configure the set of data nodes in the data network. The network orchestrator may trigger the first service transaction to re-configure the set of data nodes. Further, the method may include receiving, at the network orchestrator, a second request to trigger a second service transaction to re-configure the set of nodes. Moreover, the method may include determining whether the second service transaction conflicts with the first service transaction that is currently running. If the second service transaction does not conflict with the first service transaction, the network orchestrator may trigger the second service transaction. If the second service transaction does conflict with the first service transaction, the network orchestrator may delays triggering the second service transaction while the first transaction is running.

Additionally, the techniques described herein may be performed by a system and/or device having non-transitory computer-readable media storing computer-executable instructions that, when executed by one or more processors, performs the method described.

EXAMPLE EMBODIMENTS

Computer networking has continued to evolve and become more complex in terms of how network devices are controlled or instructed to communicate data through network architectures. For instance, SDN technologies emerged, continue to evolve, and generally include using an orchestrator such that the network services are separated from the network devices, however automatically configuring the network services from the network devices as per the service specifications provided.

Network orchestrators or controllers are built to orchestrate this execution. They have intimate knowledge of the network's configuration, architecture, infrastructure elements, users and their devices, and traffic patterns. Orchestrators that follow the intent-based networking model allow input of business objectives that they translate into network actions that they orchestrate.

As noted above, a network orchestrator uses its automation and orchestration capabilities to perform these functions. In other words, network orchestration is a subset of network management functions. Thus, an orchestrator can use a Network Management (NMS) System to implement network administrating and operating functions. The NMS can configure services in the data network instead of individual managed devices or nodes in the data network. Thus, it can provide a method for re-configuring a set of nodes in the data network. Using an NMS can help network users or administrators to configure, monitors, updates and troubleshoots the network devices in the data network. In the present NMS system, the service application programmer has to implement software code for each service created. The modification, update, and deletion of a service is subsequently enabled to handled automatically. This reduces the programing complexity, and workload for the network administrators, and thus ease the burden on the network administrators. However, various inefficiencies and disadvantages still exist when using an NMS for creating and handling services received in the network orchestrator. For example, the network orchestrator can execute a single service, and if multiple services are received at the orchestrator which may have conflicts in their processing time, it cannot detect and process them.

This disclosure describes techniques and mechanisms for reducing complexity of configuring and troubleshooting network devices in a data network. Further, the techniques described herein enable an orchestrator to process multiple services received at the same time, and optimize the services execution performance. The techniques described herein are based on optimistic concurrency control protocol for XML datastore, and refine the network service orchestrator. Optimistic concurrency control protocols offer great transactional throughput under the assumption that transactional conflicts happen only occasionally. The optimistic transactions may have three phases: (i) work phase, (ii) validation phase, (iii) update phase. These transactions work in their own workspace, and employ no locking during the work phase. At the validation phase, they enter the critical section where they check that any value they read during the working phase is still valid. If the check succeeds, the transaction proceeds to the update phase, where the underlying datastore is updated and the critical section is left. If the check fails, the transaction aborts and the critical section is left. Updated optimistic concurrency protocol for XML datastore may also be required consider the hierarchy of XML datastore.

As described herein, a network orchestrator may support processing of multiple service invocations. In this regards, the network orchestrator may contain the following objects to process multiple transactions (i) Northbound Application Programing Interface (API), (ii) N active transaction objects, (iii) Processing unit for calculating the effect of service invocations, (iv) Datastore, (v) Southbound API to deliver changes to the data network, (vi) Service lock manger object, and (vii) Service conflict manger object.

In some examples, the network orchestrator may receive a first request to trigger a first service transaction to re-configure the set of data nodes in the data network. The first request may arrive through a northbound API of the network orchestrator, and triggers an optimistic transaction object. The optimistic object may include working, validate and update phases. Later, the network orchestrator may trigger the first service transaction to re-configure the set of data nodes. Further, the network orchestrator may receive a second request to trigger a second service transaction to re-configure the set of nodes. The second request may arrive through a northbound API of the network orchestrator, and triggers an optimistic transaction object. The network orchestrator may determine whether the second service transaction conflicts with the first service transaction that is currently running in the network orchestrator. Finally, if the network orchestrator determines that the second service transaction does not conflict with the first service transaction, it triggers the second service transaction; or if determine that the second service transaction does conflict with the first service transaction, it refrain from triggering the second service transaction.

In some examples, the network orchestrator may include a service lock manager object that tracks of all currently running services. The service lock manager object may enable the network orchestrator to detect and prevent services conflicts. In some implementation, the lock manager may include a critical section that allows only the transactions not conflicting with the currently running one to be process on the network orchestrator. In order to determine if a transaction conflicts with the currently processing transaction, the service lock manager may consult a service conflict manager. If the newly arrived transaction conflicts with the currently running service, the service lock manager will put the newly arrived transaction in a waiting queue. Once the processing currently running transaction is finished, the currently running transactions leaves the critical sessions, and the service lock manager scans the waiting queue to determine if there is any transaction in the queue which is required to be processed.

As described herein as service conflict may have a lifecycle. Once a service conflict is detected, it becomes active only for a time period. Active service conflicts are the only service conflicts that can influence a transaction to enter the critical session of the service lock manager object. While a service conflict is active, the service lock manager will queue any other transactions that conflicts with current running transactions. Once the active time period of service conflict has passed, the service conflict may become passive. In some examples, if a related conflict is detected while the service conflict is not active, the service conflict may become active again with doubled active time period. The passive service conflict cannot influence a transaction to enter the critical section of the service lock manager. If no conflict occurs when the service conflict is passive, the service conflict may be removed from the service conflict manager.

Additionally, the techniques described herein may be used to reduce the number of conflicts occur due to conflicting services invocations, and thus maximizes the concurrent network service invocations. As a result, the provided techniques can increase the achievable throughput of the NMS in a data network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system architecture for a Network Management System (NMS) for configuring a set of network devices in a data network. The environment 100 includes a data network 102, and in which users 108 of user devices 106 utilize a domain-specific language to express and compile network functions to perform network operations. FIG. 1 further illustrates a network controller or orchestrator 118 in the network architecture 102 deploying the network function at an optimal location (e.g., on an optimal network component or device) in the network architecture 102.

In some examples, the network architecture 102 may include devices housed or located in one or more data centers 104. The network architecture 102 may include one or more networks implemented by any viable communication technology, such as wired and/or wireless modalities and/or technologies. The network architecture 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 102 may include devices, virtual resources, or other nodes that relay packets from one network segment to another by nodes in the computer network. The network architecture 102 may include multiple devices that utilize the network layer (and/or session layer, transport layer, etc.) in the OSI model for packet forwarding, and/or other layers. The network architecture 102 may include various hardware devices, such as routers, switches, gateways, smart NICs, NICs, ASICs, FPGAs, servers, and/or any other type of device. Further, the network architecture 102 may include virtual resources, such as VMs, containers, and/or other virtual resources.

The one or more data centers 104 may be physical facilities or buildings located across geographic areas that designated to store networked devices that are part of the network architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

The user devices 106 may establish communication connections over one or more networks 122 to communicate with devices in the network architecture 102, such as a network orchestrator or controller 118 of the network architecture 102. The network(s) 122 may include any viable communication technology, such as wired and/or wireless modalities and/or technologies. Networks 116 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The user devices 106 may communicate using any type of protocol over the network 116, such as the transmission control protocol/Internet protocol (TCP/IP) that is used to govern connects to and over the Internet.

The orchestrator 118 enables processing of multiple network services invocations. In some implementation, the orchestrator 118 may include the following objects: (i) Northbound Application Programing Interface (API), (ii) N active transaction objects (iii), Processing unit for calculating the effect of service invocations (iv), Datastore (v), Southbound API to deliver changes to the data network, (vi) Service lock manger object (vii) Service conflict manger object.

As illustrated, the orchestrator 118, may execute a processing flow to process the multiple services requests arrived at the orchestrator. The processing flow allows the orchestrator 118 to process multiple services in parallel. As shown, the processing flow may include three different phases:

(I) Working phase which includes: (IA) Work stage, (IB) Service stage, (III) Validation phase, (IV) Update phase.

As described herein in more details, the working phase includes steps 1-4 (work phase) and steps 5-6 (service phase). The steps 7-9 represent conflict detection process, step 9 represents validation phase, and step 10-11 represent the update phase.

At "1", a service request may arrive through the northbound API of the network orchestrator and triggers an optimistic transaction object. A transaction object may start in the work stage of the working phase. The request may read and write configuration data through the transaction object, and then it may commit the transaction object. All read and write operations are performed in the work stage.

At "2", before the transaction object enters into the service phase, it may create a checkpoint of indicating of its state. The checkpoint is used to declare a point that the transaction is in a consistent state. At a checkpoint, the transaction information may be stored in a datastore.

At "3", after the checkpoint has been created, the transaction object determines the services that are scheduled to be executed, and it may execute the transaction.

At "4" the transaction object may request to enter to a critical section guarded by the service lock manager object by providing the network services it collected at step III. In some implementation, the service lock manager object may track all currently running services to prevent service invocations that may conflict. To prevent conflicts, the service lock manager, may guard a critical section, and may allow only those new transactions that may not conflict with the currently running ones. Also, to decide if the services to be executed in the transaction conflict with the currently running services, the service lock manager may consult a service conflict manager. If the new transaction may conflict with the currently running ones, the service lock manager may put the transaction in a waiting queue. When a transaction finishes (step 7, 9 or 11), it may leave the critical section, and then the service lock manager scans the waiting queue to see if any of the waiting transactions can enter the critical section.

At "5", when the transaction object enters the critical section guarded by the service lock manager, the service stage of the working phase of the transaction object starts, and then the transaction object may invoke a processing unit to calculate the effect of all collected network services.

At "6", the processing unit calculates the effect of all collected network services, the read and the write operations it performs may become part of the transaction object. All read and write operations may be performed within the service stage. The service stage of the working phase of the transaction object may end at this point.

At "7", the transaction object may perform an initial read-write conflict detection before entering the critical section. First, the transaction may perform the read-write operation outside of its lock manager. If the initial conflict detection finds conflict, the execution continues by checking if the transaction can be retried or needs to be aborted.

At "8", if there is no conflict, the transaction object may take the lock. In this case, the transaction may perform the read-write operation to change the configuration of the set of data network nodes in the NMS. The working phase of the transaction object may end at this point, and the transaction object may proceed to the validate phase.

At "9" the transaction object may perform an incremental conflict detection inside its lock manager. If incremental lock detection determines that the transaction does not conflict with any other transaction objects that have committed since the transaction object has performed its initial conflict detection, the transaction may be validated, and the validation phase of the transaction object may end at this point. If the incremental conflict detection finds conflict, the execution continues by checking if the transaction can be retried or needs to be aborted. Since this process is considered expensive as only one transaction object can be in the critical section at a given time, therefore as described in step 7, the initial conflict detection may reduce the scope of the incremental conflict detection.

At "10", if there is no conflict then the transaction object may continue with its update phase. In the update phase the transaction stores the calculated changes in the datastore, and deliver the changes to the data network using the southbound API.

At "11", the transaction object may leave the critical section of the service lock manager, and release all other acquired locks. The critical section of a lock carefully controls the incoming transactions, and prevents the transactions to access the lock at the same time. The update phase of the transaction object may end at this point, and thus the transaction object may terminate.

It worth to mention that two critical sections during the lifecycle of a transaction object may exist, which both may be guarded by locks. The first one is guarded by the service lock manager. The second critical section is the traditional critical section in an optimistic transaction lifecycle, starts after step 8 (by taking the lock) and ends at step 9 or step 11. Therefore, the validity of the optimistic transaction object can be checked (e.g., read-write conflict detection) and the changes can be persisted in the datastore.

In some examples, if a conflict has been detected at step 7 or 9, the service conflict manager may perform an investigation process to determine which stage of the transaction (e.g., work, service) the conflict has occurred. If all conflicts occurred during the service phase, any acquired locks may be released, and the transaction may be restored to restart from the checkpoint (step 2) since there may be a high chance that the partial retry of the transaction may succeed. If a conflict is caused by read and write operations during the service creation stage, then the conflicting service may be registered with the service conflict manager.

Figure 2:
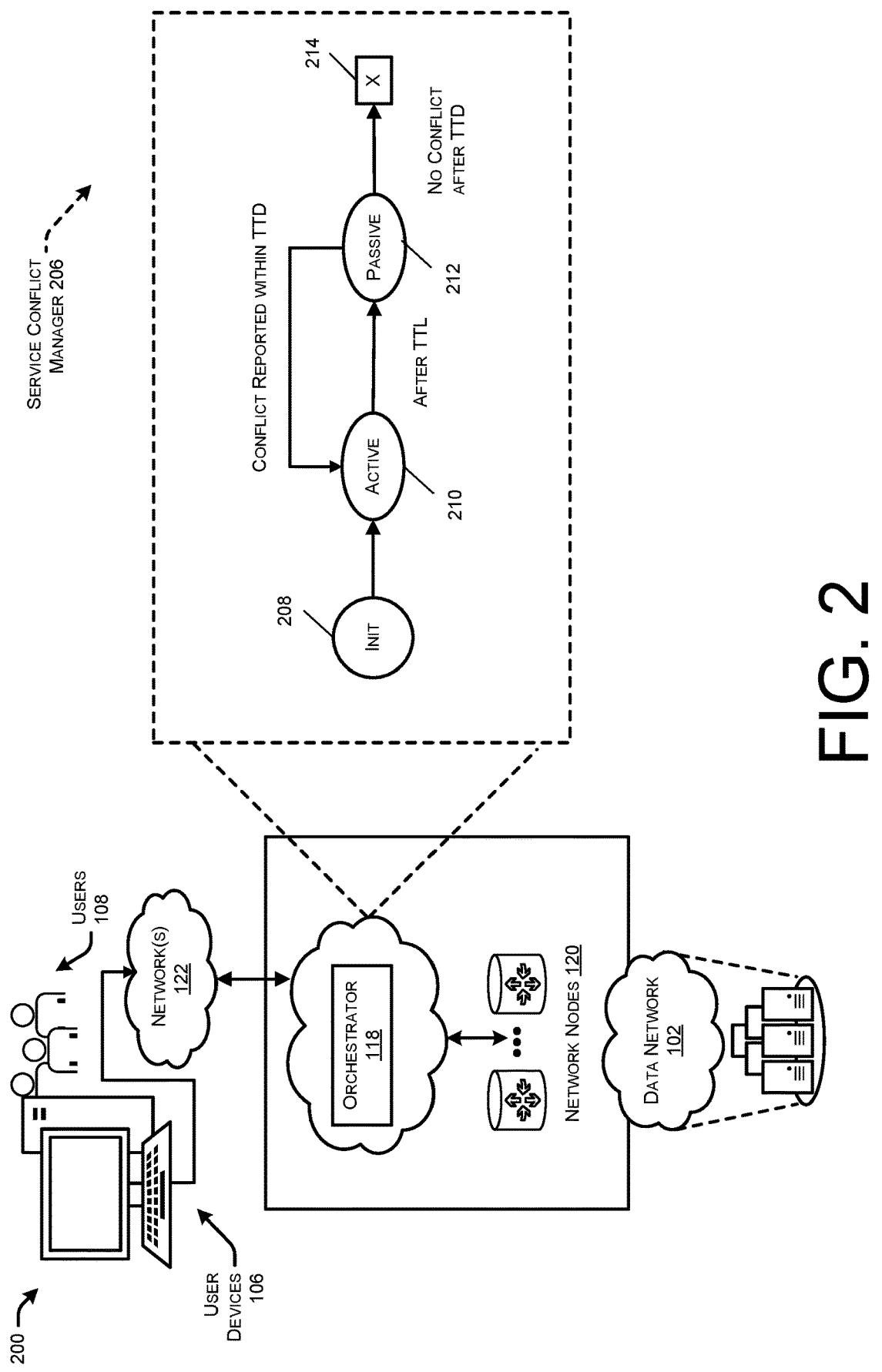
FIG. 2 illustrates a system diagram of an example of an NMS architecture for detecting and processing service conflicts.

FIG. 2 illustrates a system diagram of an example of an NMS architecture for detecting and processing service conflicts. The environment 100 includes a data network 102, and in which users 108 of user devices 106 utilize a domain-specific language to express and compile network functions to perform network operations. FIG. 2 further illustrates a network controller or orchestrator 118 in the network architecture 102 deploying the network function at an optimal location (e.g., on an optimal network component or device) in the network architecture 102.

As illustrated, the orchestrator 118, may include a service conflict manager 106 that manages and handle service conflicts. The service conflict manager 106 may execute a process to detect and avoid service conflicts by delaying service invocations that are known to conflict with the currently running service conflicts. The conflicts occurred among multiple transactions. The service conflict manager 106, may derive the conflicts among multiple services from conflicts during reading or writing data from/to network orchestrator. As illustrated, a service conflicts may be in an active state 208 for a time period, i.e. Time-to-Live (TTL). Thus, when a service conflict registers at state 208, it may become an active conflict for the TTL. Only active conflicts are allowed to influence a transactions object so it can enter the critical section of the service lock manager object. While the service conflict is in active 210, the service conflict manager will queue any other transactions that may conflict with the currently running services.

Once the TTL time expires, the service conflict may become passive (state 212) for a time period, i.e. Time-to-Die (TTD). While the service conflict is in passive state 212, it may not influence which transactions can enter the critical section of service lock manager. While a service conflict is in the passive state, and a transaction associated with the service conflict arrives, it may not be put in the waiting queue. In this case, the transaction may be allowed to enter the critical section of the service lock manager. If a relevant conflict occurs while the service conflict is in passive state 212, the service conflict may return to active state 210, and may stay in the active state for a time period equivalent to double of previous TTL.

It is appreciated that defining active state 210 and passive state 212 for service conflicts, and allowing the active state 210 to be live for TTL and the passive state 212 to die for TTD, the conflict manager can increase its information and knowledge of the service conflicts, and thus it can improve its ability to avoid the conflicts more efficiently and more effectively. As a result, this will reduce the number of service conflicts over time, and thus increase the throughput from/to an NMS node.

Generally, the techniques described in FIG. 1-2, may enable the network orchestrator 118 to process parallel network service invocation; may enable a service partially retry and optimistic transaction using checkpoint; may enable a service to retry, and perform a method of fine-grain locking of optimistic transactions while supporting higher order function applications over XML datastore (In this method, a data network service is considered as a higher order function; a mapping from XML document to XML document).

Figure 3:
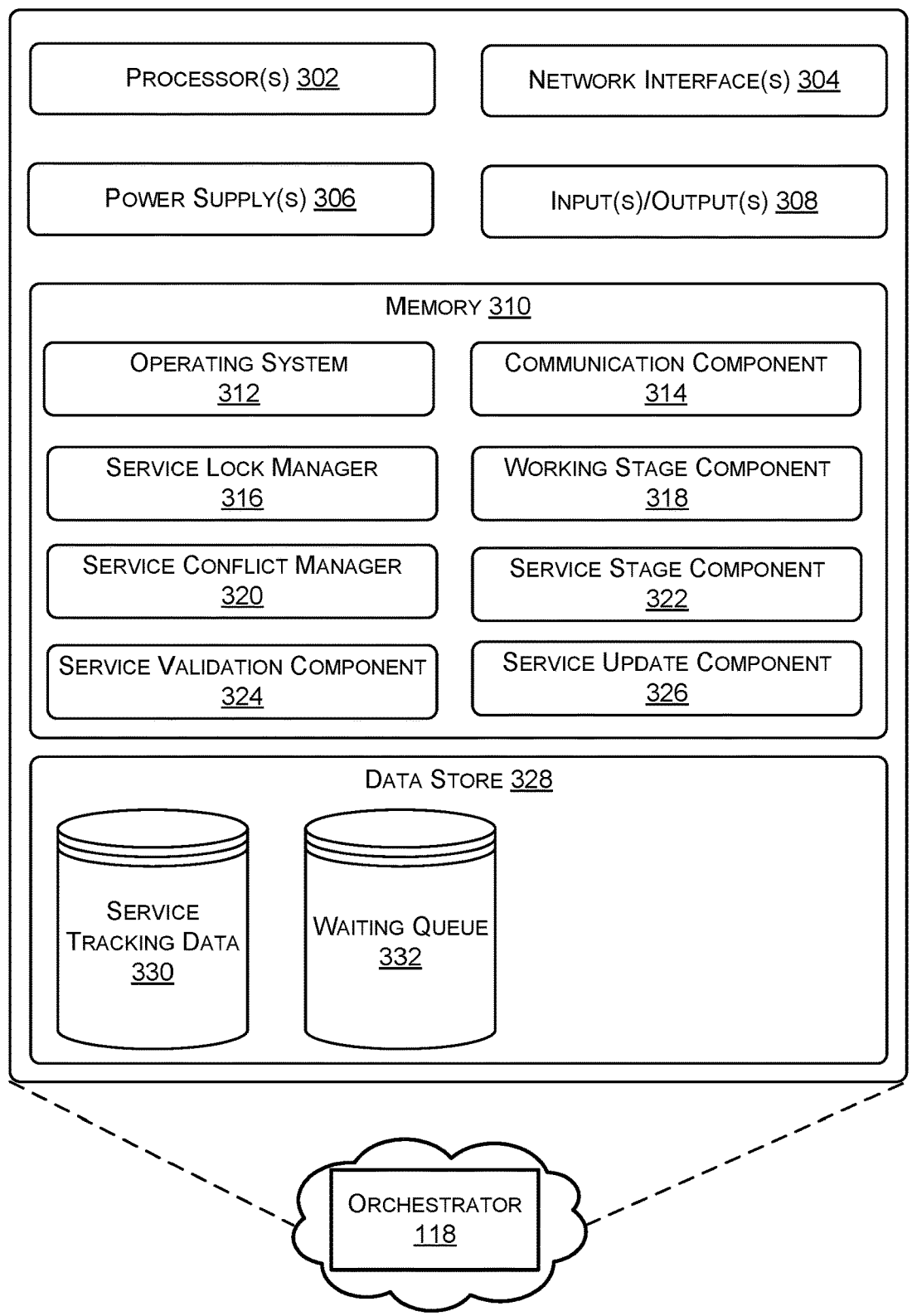
FIG. 3 illustrates a component diagram of an example network orchestrator that that can be utilized to implement aspects of technologies disclosed herein.

FIG. 3 illustrates a component diagram 300 of an example orchestrator device (e.g., user device 118) through which can manage, handle service conflicts and performs networks function according to some aspects of the present disclosure. The orchestrator device 106 may be any type of computing device capable of receiving expressions of network functions via a network interface 304 and sending network commands to the network 122 via a suitable data communications network such as, but not limited to, a laptop or desktop computer, a tablet computing device, a server computer, a television, or a mobile telephone.

As illustrated, the user device 118 may include one or more hardware processors 302 (processors), one or more devices, configured to execute one or more stored instructions. The processor(s) 302 may comprise one or more cores. Further, the user device 118 may include one or more network interfaces 304 configured to provide communications between the user orchestrator 118, and/or other systems or devices in the network architecture 102 and/or remote from the network architecture 102. The network interfaces 304 may include devices configured to couple to personal area networks (PANs), wired and wireless local area networks (LANs), wired and wireless wide area networks (WANs), and so forth. For example, the network interfaces 304 may include devices compatible with Ethernet, Wi-Fi, and so forth.

The network orchestrator device 118 can include one or more power supplies 306, such as one or more batteries, connections to mains power, etc. The orchestrator device 118 can also include one or more inputs and outputs 308 for receiving and processing input from a number of input devices, such as a keyboard, a mouse, a touchpad, a touch screen, an electronic stylus, or other type of input device. Further, the input/outputs 308 can include a display, such as a computer monitor, a flat-panel display, a digital projector, a printer, or other type of output device. It will be appreciated that the orchestrator device 118 might not include all of the components shown in FIG. 3, can include other components that are not explicitly shown in FIG. 2, or might utilize an architecture completely different than that shown in FIG. 3.

The orchestrator device 118 may also include memory 310, such as computer-readable media, that stores various executable components (e.g., software-based components, firmware-based components, etc.). The memory 310 may generally store components to implement functionality described herein. The memory 310 may store an operating system 312 utilized to control the operation of components of the orchestrator device 118. Further, the memory 310 may store a communication component 314 that comprises software (e.g., any protocol stack) to enable the orchestrator device 118 to communicate with other devices using the network interface 304.

In some instances, the memory 310 may store a service lock manager component 316 configured to enable orchestrator device 118 to access services requests from network devices. The service lock manager 310 may comprises a human readable code or binary machine code, when executed on the processor 302, may enable the orchestrator 1116 to keep track of all currently running services. In order to prevent a conflict, the service lock manager 316 may guard a critical section, and allow only those transactions not conflicting with the currently running ones to enter the critical section. Accordingly, the service lock manager 316 may consult service conflict manager 316 to determine if a service conflicts with currently running services.

In some instances, the memory 310 may store a service conflict manager 320 configured to enable orchestrator device 118 to manage and handle services conflicts. The service conflict manager 320 may comprises a human readable code or binary machine code, when executed on the processor 302, may enable the orchestrator 116 to register and manages the conflicts. If a transaction conflicts with currently running ones, the service conflict manages 320 may put the transaction in a waiting queue. When processing of transaction finished, it leaves the critical section, and the service lock manager 316 may scan the waiting queue to determine if any of the waiting transaction can enter the critical section.

In some instances, the memory 310 may store a working stage component 318 configured to enable orchestrator device 118 to read or write configuration data from/to transaction object. The working stage component 318 may comprises a human readable code or binary machine code, when executed on the processor 302, may enable the orchestrator 116 to read or write configuration data from/to a transaction object. In addition, the working stage component enable the orchestrator 118 to commit the transaction object, once the configuration data is read/written.

In some instances, the memory 310 may store a service stage component 322 configured to enable orchestrator device 118 to calculate the effects of all transaction objects collected by the service lock manager 316. The service stage component 318 may comprises a human readable code or binary machine code, when executed on the processor 302, may enable the orchestrator 116 to calculate the effects of all collected transaction objects. When a transaction object enters the critical section guarded by the service lock manager component 314, the service stage component 3128 invokes a process unit to calculate the effect of all collected network services.

In some instances, the memory 310 may store a service validation component 324 configured to enable orchestrator device 118 to perform a conflict detection inside the lock manager 316. The validation stage component 324 may comprises a human readable code or binary machine code, when executed on the processor 302, may enable the orchestrator 116 to perform an incremental conflict detection process.

In some instances, the memory 310 may store a service update component 326 configured to enable orchestrator device 118 to perform a validation check process to validate and process the conflicts. The service update component 3246 may comprises a human readable code or binary machine code, when executed on the processor 302, may enable the orchestrator 116 to validate and process the conflicts. If no conflict is detected, the transaction stores the calculated changes in the datastore 328, and delivers the calculated changes to the data network using the northbound API. Then, the transaction object leaves the critical section of the service lock manage 316, and releases all other acquired locks.

The orchestrator 118 may further include a data store 328, which may comprise any type of computer memory including long-term memory (e.g., Read Only Memory (ROM), Random Access Memory (RAM), caches, etc.). The data store 328 may include a service tracking data component 330 that tracks all currently running network services. Further, the data store 328 may include a waiting queue 322 that stores the services conflicting with the currently running services.

FIG. 4 is a flow diagram of an example method illustrating the communication flow among the network orchestrator and other network devices for processing multiple transactions in a data network according to some aspect of described herein.

At step 403, a network administrator 108 requests processing a service via administrator device 106. In some examples, the network administration 108 my request the service by modifying configuration data of network device function using a domain-specific language or a general-purpose language, and generating code for executing the service.

At step 404, the network device 106 transmits the requested service transaction to the network orchestrator 118. The network orchestrator 118 may perform conflict detection and handling process as previously described.

At step 406, the network orchestrator 118, transmit the data to process the service transaction, and re-configure a set of network devices 122 associated to the service transaction.

At step 408, once the set of network devices are configured, the administrator device 106 transmit data packets to the set of network devices 122.

FIG. 5 illustrates a flow diagram of an example method for processing multiple transactions in an orchestrator of a data network. Further, the method describes configuring a set of data nodes in in the data network.

At step 502, a network orchestrator of a data network receives a first request to trigger a first service transaction to re-configure a set of data nodes in the data network. The first request may be received through northbound Application Programming Interface (API).

At step 504, the network orchestrator triggers the first service transaction to re-configure the set of data nodes. The service transaction initiates an optimistic transaction object, which will have working, validation and update phases as previously described in FIG. 1.

At step 506, the network orchestrator receives a second request to trigger a second service transaction to re-configure the set of nodes. The second request may be received through northbound (API).

At step 508, the network orchestrator determines whether the second service transaction conflicts with the first service transaction that is currently running. If network orchestrator detects a conflict between the first and the second conflicts, it may put the second service transaction in a waiting que. As described previously in FIG. 1, a service lock manager tracks all of currently running services. For instance, the service lock manager may guard a critical section, and allows only those transaction which will not conflict with the first transaction or any currently running transaction.

At step 510, if second service transaction does not conflict with the first service transaction, the network orchestrator triggers the second service transaction. If the second service transaction does conflict with the first service transaction, the network orchestrator delays trigger the second service transaction while the first transaction is running.

Figure 6:
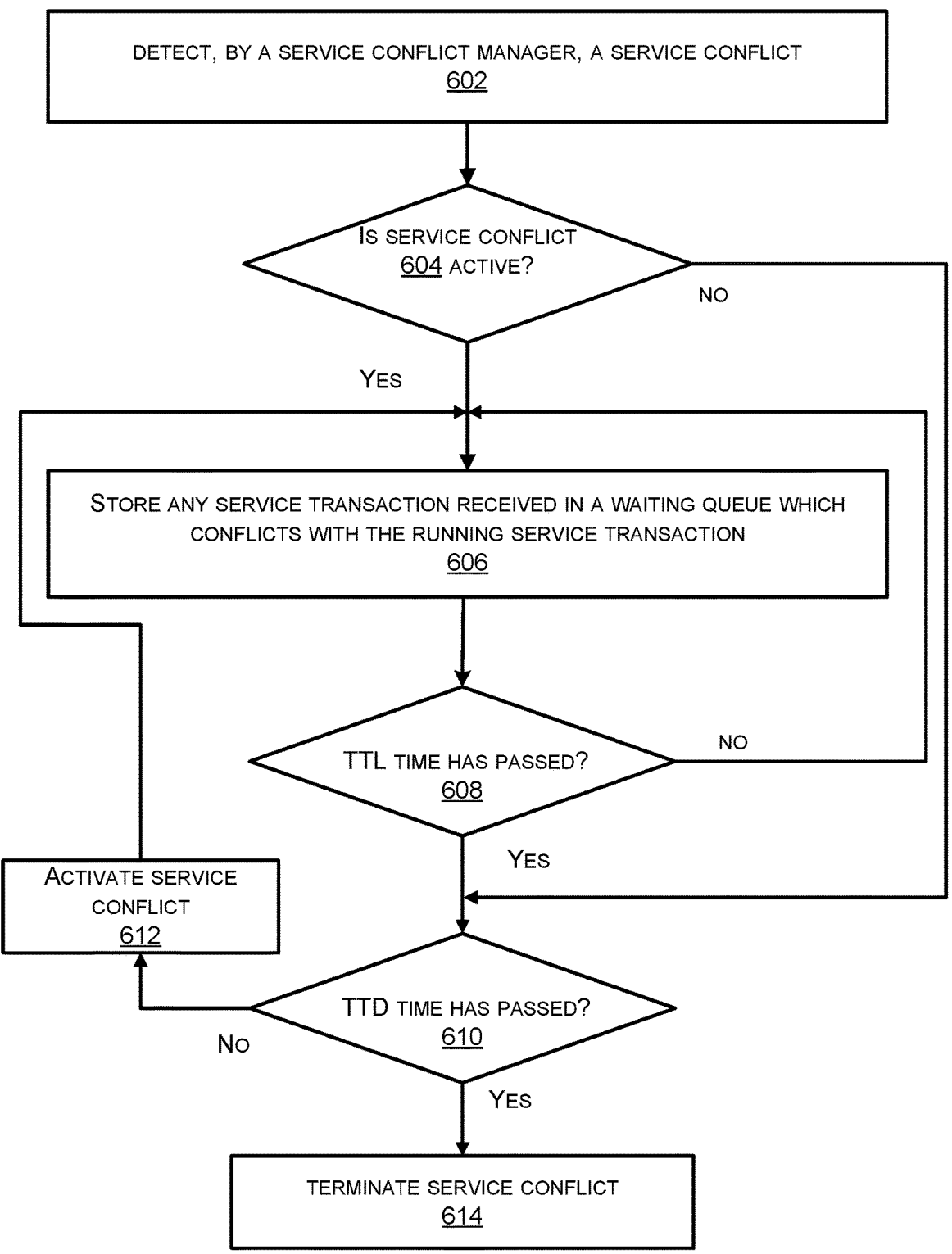
FIG. 6 illustrates a flow diagram of an example method for detecting service conflicts, and processing multiple services in an orchestrator of a data network.

FIG. 6 illustrates a flow diagram of an example method for detecting service conflicts, and processing multiple services in an orchestrator of a data network.

At step 602, a service conflict manager detects if a conflict occurs between a first service currently running, and a second service arrived at the network orchestrator to be processed. First, the service conflict manager investigates the conflict the stage at which the conflict has occurred. If the conflict occurred during the service phase, the service lock manager may release the acquired lock, and the transaction may be retried from the checkpoint. If the conflict did not occur during the service creation phase (i.e., not a service conflict), the transaction may abort may be required to restart. If the conflict is caused by a read and write operation that happened during the service creation stage, then the conflict may be registered with service conflict manager.

At step 604, the service conflict manage determines if the service conflict is active. If the service conflict is not active the method proceeds to the step 610. Otherwise, it proceeds to the step 606. Active service conflicts can influence whether a transaction object can enter the critical section of the service lock manager object. As described previously, when a service conflict is active, the service conflict manager will put any new transaction in a queue.

At step 606, the service conflict manager stores the second service transaction in a waiting queue received at the network orchestrator. In this case, the first transaction may hold the lock until the processing of the first transaction is finished, and the lock can be released.

At step 608, the service conflict manager checks if TTL for the service conflict has passed. If TTL has passed the method proceeds to step 610. Otherwise, it proceeds to step 606. Once the TTL time expires, the service conflict becomes passive for TTD time. While the service conflict is passive it cannot influence which transactions can enter the critical section of the service lock manager.

At step 610, the service conflict manager checks if TTD for the service conflict has passed. If TTD has passed the methods proceeds to step 614. Otherwise it proceeds to step 612, activates the service conflict, and proceeds to the step 606. If a relevant conflict happens while the service conflict is passive, the service conflict may become active again with doubled TTL.

Figure 7:
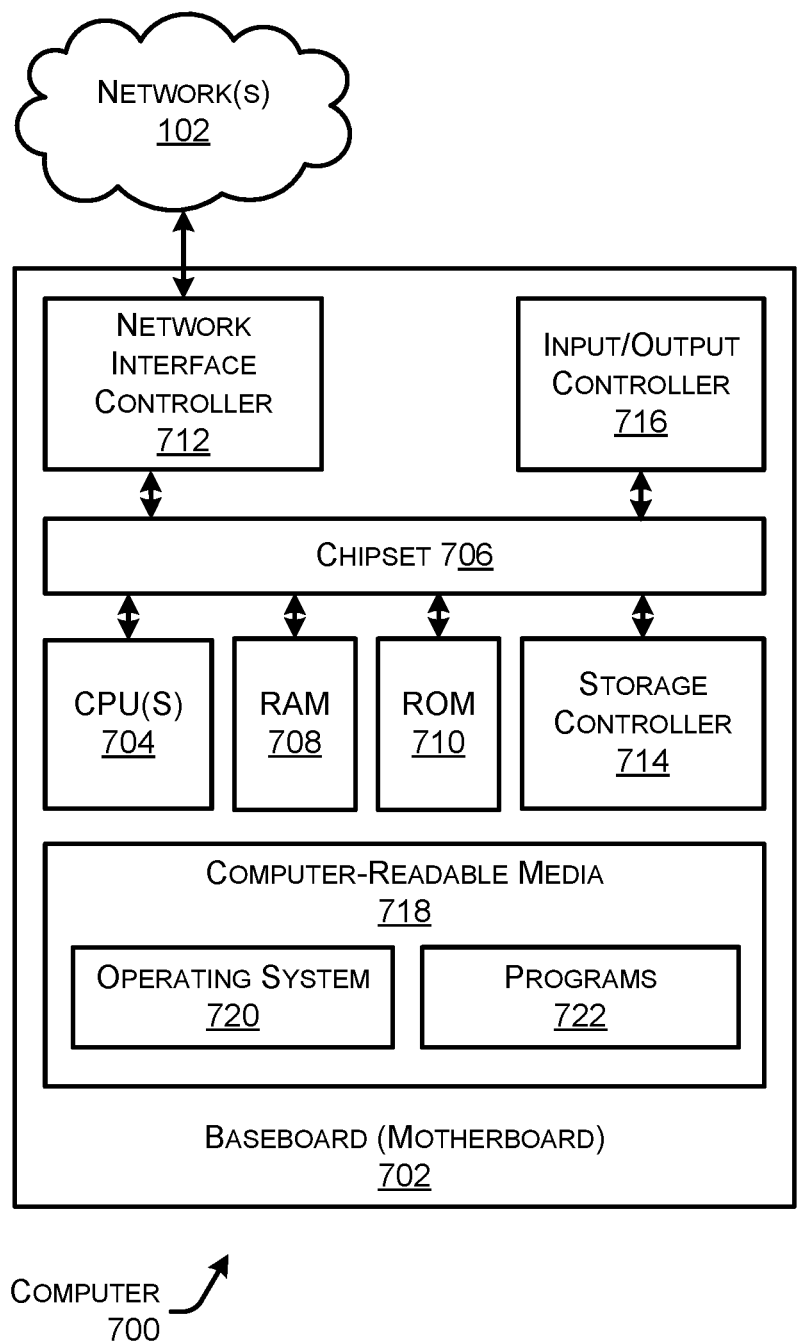
FIG. 7 is a computer architecture diagram showing an illustrative computer hardware architecture for implementing a computing device that can be utilized to implement aspects of the various technologies presented herein.

At step 614, if the TTD for the service conflicts has passed, the service conflict manager terminates the service conflicts, and the service conflict will be removed FIG. 7 shows an example computer architecture for a device capable of executing program components for implementing the functionality described above. The computer architecture shown in FIG. 7 illustrates any type of computer 700, such as a conventional server computer, workstation, desktop computer, laptop, tablet, network appliance, e-reader, smartphone, or other computing device, and can be utilized to execute any of the software components presented herein. The computer 700 may, in some examples, correspond to an orchestrator device 118, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 112. The chipset 706 can include functionality for providing network connectivity through a NIC 712, such as a gigabit Ethernet adapter. The NIC 712 is capable of connecting the computer 700 to other computing devices over the network 122. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the network orchestrator 118, and or any components included therein, may be supported by one or more devices similar to computer 700. Stated otherwise, some or all of the operations performed by orchestrator device 118 and/or network controller 118, and or any components included therein, may be performed by one or more computer devices 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 1300 has access to computer-readable storage media storing computer-executable instructions which, when executed by the computer 700, perform the various processes described above with regard to FIGS. 1-12. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIGS. 1,2 and/or 3, can include other components that are not explicitly shown in FIG. 13, or might utilize an architecture completely different than that shown in FIG. 7.

As described herein, the computer 700 may comprise one or more of a orchestrator device 118 and/or any other device. The computer 700 may include one or more hardware processors 704 (processors) configured to execute one or more stored instructions. The processor(s) 704 may comprise one or more cores. Further, the computer 700 may include one or more network interfaces configured to provide communications between the computer 700 and other devices, such as the communications described herein as being performed by the orchestrator device 118. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for generating SNFs using a DSL and/or deploying SNFs to optimized network components.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for a network orchestrator to manage a data network, the method comprising:
   receiving, at the network orchestrator, a first request to trigger a first service transaction to re-configure the data network, the first service transaction defining first configuration changes to be made to managed configurations associated with the data network;
   triggering, by the network orchestrator, the first service transaction to re-configure the data network using the first configuration changes during a period of time;
   receiving, at the network orchestrator, a second request to trigger a second service transaction to re-configure the data network, the second service transaction defining second configuration changes to be made to the managed configurations of the data network;
   determining whether the second configuration changes conflict with the first configuration changes that are currently running;
   based at least in part on determining that the second configuration changes do not conflict with the first configuration changes, triggering the second service transaction such that the second configuration changes are made to the data network at least partly during a period of time in which the first configurations are made to the data network; and based at least in part on determining that the second configuration changes do conflict with the first configuration changes:
  determining a period of time during which the second configuration changes conflict with the first configuration changes;
  refraining from triggering a first portion of the second configuration changes until a second portion of the first service configurations finished running, wherein the second configuration changes are stored in a waiting queue associated with the network orchestrator during the period of time during which the second configuration changes conflict with the first configuration changes; and
  triggering, by the network orchestrator, the first portion of the second configuration changes subsequent to the second portion of the first service configurations finishing running.

2. The method of claim 1, wherein determining whether they conflict includes:
  calculating an effect caused by running the second service transaction at a same time as the first service transaction; and
  determining whether the effect violates a threshold condition.

3. The method of claim 1, in response to determining that a third service transaction does conflict with the first service transaction, further comprising:
  storing an indication of the third service transaction in a waiting queue associated with the network orchestrator;
  determining that the first service transaction has finished running; and
  triggering the third service transaction.

4. The method of claim 1, in response to determining that the second configuration changes do not conflict with the first configuration changes, prior to triggering the second service transaction, further comprising:
  validating the second service transaction as being allowable to re-configure the data network.

5. The method of claim 1, further comprising, in response to determining that the second configuration changes do not conflict with the first configuration changes, prior to triggering the second service transaction, notifying the network orchestrator that the second service transaction does not conflict with the first service transaction.

6. The method of claim 1, wherein a service conflict manager performs the determining whether the second service transaction conflicts with the first service transaction.

7. The method of claim 1, further comprising:
  determining that a third service transaction has a conflict with the first service transaction;
  determining the period of time during which the conflict is active; and
  the third service transaction is stored in the waiting queue associated with the network orchestrator during the period of time.

8. The method of claim 7, further comprising once the period of time has passed, determining to remove the third service transaction from the waiting queue.

9. A system for managing a data network, the system comprising:
  one or more processors; and
  one or more non-transitory computer-readable media storing computer-executable instructions that, when executed by the one or more processors, cause the one or more processors to perform operations comprising:
    receiving, at a network orchestrator, a first request to trigger a first service transaction to re-configure the data network, the first service transaction defining first configuration changes to be made to managed configurations associated with the data network;
    receiving, at the network orchestrator, a second request to trigger a second service transaction to re-configure the data network, the second service transaction defining second configuration changes to be made to the managed configurations of the data network;
    determining whether the second configuration changes conflict with the first configuration changes that are currently running;
    based at least in part on determining that the second configuration changes do not conflict with the first configuration changes, triggering the second service transaction such that the second configuration changes are made to the data network at least partly during a period of time in which the first configurations are made to the data network; and
    based at least in part on determining that the second configuration changes do conflict with the first configuration changes:
      determining a period of time during which the second configuration changes conflict with the first configuration changes;
      refraining from triggering a first portion of the second configuration changes until a second portion of the first service configurations finished running, wherein the second configuration changes are stored in a waiting queue associated with the network orchestrator during the period of time during which the second configuration changes conflict with the first configuration changes; and
      triggering, by the network orchestrator, the first portion of the second configuration changes subsequent to the second portion of the first service configurations finishing running.

10. The system of claim 9, wherein determining whether they conflict includes:
  calculating an effect caused by running the second service transaction at a same time as the first service transaction; and
  determining whether the effect violates a threshold condition.

11. The system of claim 9, in response to determining that a third service transaction does conflict with the first service transaction, the operations further comprising:
  storing an indication of the third service transaction in the waiting queue associated with the network orchestrator;
  determining that the first service transaction has finished running; and
  triggering the third service transaction.

12. The system of claim 9, in response to determining that the second configuration changes do not conflict with the first configuration changes, prior to triggering the second service transaction, the operations further comprising:
  validating the second service transaction as being allowable to re-configure the data network.

13. The system of claim 9, the operations further comprising, in response to determining that the second configuration changes do not conflict with the first configuration changes, prior to triggering the second service transaction, notifying the network orchestrator that the second service transaction does not conflict with the first service transaction.

14. The system of claim 9, wherein a service conflict manager performs the determining whether the second service transaction conflicts with the first service transaction.

15. The system of claim 9, the operations further comprising:
  determining that a third service transaction has a conflict with the first service transaction;
  determining the period of time during which the conflict is active; and
  the third service transaction is stored in the waiting queue associated with the network orchestrator during the period of time.

16. The system of claim 15, the operations further comprising once the period of time has passed, determining to remove the third service transaction from the waiting queue.

17. One or more non-transitory computer-readable storage media having stored therein instructions which, when executed by one or more processors, cause the one or more processors to perform operations comprising:
  receiving, at a network orchestrator that manages a data network, a first request to trigger a first service transaction to re-configure the data network, the first service transaction defining first configuration changes to be made to managed configurations associated with the data network;
  triggering, by the network orchestrator, the first service transaction to re-configure the data network using the first configuration changes during a period of time;
  receiving, at the network orchestrator, a second request to trigger a second service transaction to re-configure the data network, the second service transaction defining second configuration changes to be made to the managed configurations of the data network;
  determining whether the second configuration changes conflict with the first configuration changes that are currently running;
  based at least in part on determining that the second configuration changes do not conflict with the first configuration changes, triggering the second service transaction such that the second configuration changes are made to the data network at least partly during a period of time in which the first configurations are made to the data network; and
  based at least in part on determining that the second configuration changes do conflict with the first configuration changes:
    determining a period of time during which the second configuration changes conflict with the first configuration changes;
    refraining from triggering a first portion of the second configuration changes until a second portion of the first service configurations finished running, wherein the second configuration changes are stored in a waiting queue associated with the network orchestrator during the period of time during which the second configuration changes conflict with the first configuration changes; and
    triggering, by the network orchestrator, the first portion of the second configuration changes subsequent to the second portion of the first service configurations finishing running.

18. The one or more non-transitory computer-readable storage media of claim 17, wherein determining whether they conflict includes:
  calculating an effect caused by running the second service transaction at a same time as the first service transaction; and
  determining whether the effect violates a threshold condition.

19. The one or more non-transitory computer-readable storage media of claim 17, in response to determining that a third service transaction does conflict with the first service transaction, further comprising:
  storing an indication of the third service transaction in the waiting queue associated with the network orchestrator;
  determining that the first service transaction has finished running; and
  triggering the third service transaction.

20. The one or more non-transitory computer-readable storage media of claim 17, the operations further comprising, in response to determining that the second configuration changes do not conflict with the first configuration changes, prior to triggering the second service transaction, notifying the network orchestrator that the second service transaction does not conflict with the first service transaction.

* * * * *